United States Patent [19]

Kobayashi et al.

[11] Patent Number: 5,048,388

[45] Date of Patent: Sep. 17, 1991

[54] ROTARY KNIFE ASSEMBLY

[75] Inventors: Tatsunori Kobayashi; Masayuki Inoue, both of Anpachi, Japan

[73] Assignee: Mitsubishi Metal Corporation, Tokyo, Japan

[21] Appl. No.: 500,452

[22] Filed: Mar. 28, 1990

[30] Foreign Application Priority Data

Mar. 31, 1989 [JP] Japan .............................. 1-37871[U]

[51] Int. Cl.5 .............................................. B23D 19/06

[52] U.S. Cl. ........................................ 83/504; 83/495; 83/499; 83/698

[58] Field of Search ................. 83/481, 495, 498, 499, 83/502, 501, 504, 506, 582, 675, 676, 698, 699, 700; 403/261, 348

[56] References Cited

U.S. PATENT DOCUMENTS

| | | | |
|---|---|---|---|
| 628,441 | 4/1899 | Beck | 83/675 |
| 2,666,485 | 1/1954 | Antosh | 83/501 |
| 3,227,024 | 1/1966 | Krebs | 83/698 |
| 4,257,299 | 3/1981 | Aykut | 83/504 |
| 4,801,232 | 1/1989 | Hempel | 403/348 |

FOREIGN PATENT DOCUMENTS

| | | |
|---|---|---|
| 0275909 | 7/1988 | European Pat. Off. . |
| 3321505 | 12/1984 | Fed. Rep. of Germany . |

*Primary Examiner*—Mark Rosenbaum
*Assistant Examiner*—Allan M. Schrock
*Attorney, Agent, or Firm*—Cushman, Darby & Cushman

[57] ABSTRACT

A rotary knife assembly includes a rotary shaft, a flange, a rotary knife of an annular shape and a resilient member. The flange includes a radially-outwardly protruding flange portion having opposite end faces and a reduced diameter portion disposed adjacent to the flange portion. The rotary knife has opposite faces and is fitted on the reduced-diameter portion of the flange with one of the opposite faces directed toward one of the opposite end faces of the flange portion. The resilient member is mounted on the flange for urging the rotary knife toward the flange portion. There is also provided a shifting mechanism mounted on the flange for shifting the rotary knife in a direction away from the flange portion against the urging force of the resilient member.

11 Claims, 5 Drawing Sheets

ROTARY KNIFE ASSEMBLY

BACKGROUND OF THE INVENTION

1. Field of the Invention

The present invention generally relates to a rotary knife assembly which is coupled with another rotary knife assembly to provide a pair of upper and lower rotary knife assemblies, and in particular to the technique for producing contact pressure between the upper and lower knives.

2. Prior Art

FIG. 1 depicts a conventional rotary knife assembly, which includes an annular rotary knife 1 securely fitted on a rotary shaft 2 through a flange 3. The flange 3 includes a flange portion 4 disposed at one end thereof and having a diameter greater than the other end of the flange. A pressure oil chamber 5 is formed in the flange 3 so as to be disposed adjacent to the inner peripheral surface thereof and extends along the entire circumference thereof. Formed in the flange 3 is a radially extending bore 6 which opens at the outer end to the outer peripheral surface of the flange 3 and is communicated at the inner end with the pressure oil chamber 5. A piston 7 is sealingly fitted in the bore 6 for sliding movement therealong, and an end member 8 is securely fixed to an opening end of the bore 6. A screw member 9 is threadedly engaged with an internally threaded aperture of the end member 8 to urge the piston 7 radially inwardly of the flange 3. The rotary knife 1 is first fixed to the flange portion 4, and then the flange 3 is fitted on the rotary shaft 2. Subsequently, the screw member 9 is tightened to cause the piston 7 to move radially inwardly of the flange 3, and thus an operating oil is pressurized into the pressure oil chamber 5 to bring the inner peripheral portion of the flange 3 into abutting engagement with the rotary shaft 2, whereby the flange 3 is securely fixed to the shaft 2.

Two rotary knife assemblies, each of which is constructed according to the aforesaid assembly, are arranged to provide a pair of upper and lower assemblies, and are utilized for cutting sheets of various materials.

In the rotary knife assemblies as described above, however, the upper and lower knives are arranged with a prescribed clearance formed therebetween, and hence it is impossible to cut a thin sheet of material such as a synthetic resin film. Accordingly, there have been developed rotary knife assemblies as disclosed in FIGS. 2 to 4.

The rotary knife assembly as shown in FIG. 2 includes a rotary shaft 10 having a flange portion 10*a* and an externally threaded reduced-diameter portion 10*b*. A plurality of flange members 11, each of which is provided with an annular disc-shaped rotary knife 12, are fitted on the shaft 10 in series in such a manner that the flange 11 arranged at one end is disposed adjacent to the flange portion 10*a* with a collar 13 interposed therebetween, and a nut member 14 is threaded on the reduced-diameter portion 10*b* with a collar 15 interposed between the nut member 14 and the flange 11 arranged at the other end, whereby the flanges 11 are securely fixed to the rotary shaft 10. Each rotary knife 12 is fitted on a reduced-diameter portion of a respective flange 11 for sliding movement therealong, and a belleville spring 16 is disposed around the reduced-diameter portion of the flange for resiliently pressing the rotary knife 12 in a direction away from a flange portion of the flange 11.

In operation, the aforesaid rotary knife assembly is coupled with a rotary knife assembly which includes the same number of securely fixed rotary knives. After installing the rotary shaft 10 of the rotary knife assembly in a cutting machine, the rotary shaft 10 is caused to move axially thereof to bring the side face of each rotary knife 12 into pressure contact with that of a respective one of the mating rotary knives to thereby adjust contacting pressure therebetween.

Furthermore, the rotary knife assembly shown in FIG. 3 differs from the previous assembly in that each rotary knife 12, fitted on the reduced-diameter portion, is pressed toward the flange portion of the flange 11 by a coil spring 17; and there is provided a mounting ring 18 disposed around the reduced-diameter portion of the flange 11 to retain each spring 17 in position.

Furthermore, the rotary knife assembly as shown in FIG. 4 includes a fastening bolt 19 threaded through the flange portion of the flange 11 for fastening the flange 11 to the rotary shaft.

For utilizing the rotary knife assemblies as shown in FIGS. 2 and 3, the cutting machine must be provided with a mechanism for moving the rotary shaft 10 in an axial direction, resulting in an increase in cost. The provision of the shaft-moving mechanism lessens the mechanical rigidity and precision of the cutting machine, and hence the cutting machine with such a rotary knife assembly cannot be suitably used to cut a thick product such as steel plates. Therefore, two kinds of cutting machines must be installed when both of thin and thick products must be cut, thereby being uneconomical.

Moreover, the rotary knife assembly as shown in FIG. 4 does not require the shaft-moving mechanism to be provided; the flange 11 must be moved by hand. Therefore, the cutting operation is inefficient and high cutting precision cannot be achieved due to the fluctuation in contacting pressure between the mating knives.

SUMMARY OF THE INVENTION

It is therefore the object of the present invention to provide a rotary knife assembly in which a uniform contact pressure can be easily ensured between the mating rotary knives without moving the shaft.

According to the present invention, there is provided a rotary knife assembly comprising a rotary shaft having an axis of rotation therethrough, a flange fitted on and securely fixed to the rotary shaft, the flange including a radially-outwardly protruding flange portion having opposite end faces and a reduced-diameter portion disposed adjacent to the flange portion; a rotary knife of an annular shape having opposite faces and fitted on the reduced-diameter portion of the flange with one of the opposite faces directed toward one of the opposite end faces of the flange portion; a resilient member mounted on the flange for urging the rotary knife toward the flange portion; and shifting means mounted on the flange for shifting the rotary knife in a direction away from the flange portion, against the urging force of the resilient member.

DESCRIPTION OF THE PREFERRED EMBODIMENTS OF THE INVENTION

Figure 5:
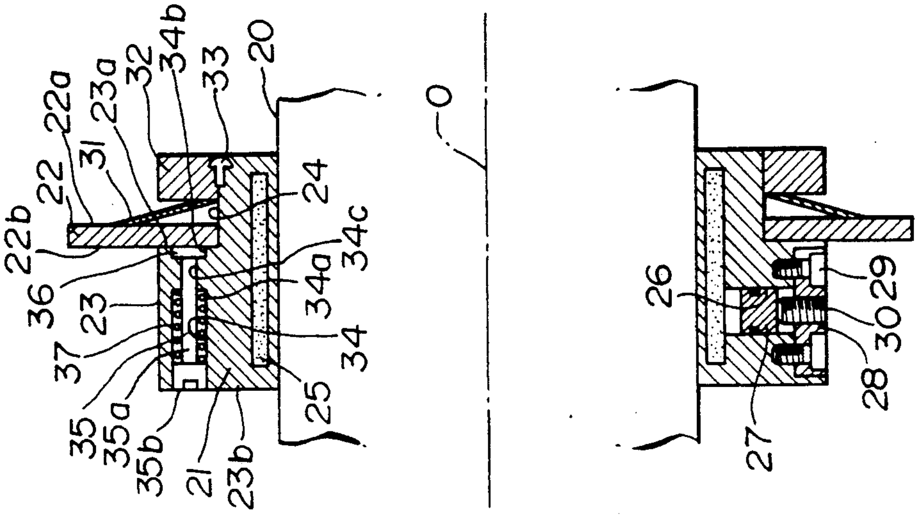
FIG. 5 is a cross-sectional view of a rotary knife assembly in accordance with the present invention.

FIG. 5 depicts a rotary knife assembly in accordance with the present invention, which includes a rotary shaft 20 having an axis 0 of rotation therethrough, a flange 21 fitted on and securely fixed to the rotary shaft 20 and a rotary knife 22 mounted on the flange 21. The flange 21 has inner and outer peripheral surfaces, and includes a radially-outwardly protruding flange portion 23 having opposite end faces 23*a* and 23*b* and a reduced-diameter portion 24 disposed adjacent to the flange portion 23 and having a diameter smaller than that of the flange portion 23.

As was the case with the conventional assemblies, a pressure oil chamber 25 which holds an operating oil therein is formed in the flange 21. The pressure oil chamber 25 is disposed adjacent to the inner peripheral surface of the flange 21, and extends along the entire circumference thereof, whereby an annular wall portion of a uniform thickness is defined between the inner peripheral surface and the pressure oil chamber 25. In addition, the flange portion 23 of the flange 21 has a radially extending bore 26 which opens at the outer end to the outer peripheral surface of the flange portion 23 and is communicated at the inner end with the pressure oil chamber 25. The radial bore 26 has an inner portion to define a cylinder portion and an outer opening end portion having a greater diameter than the inner portion. A piston 27 with an O-ring therearound is sealingly fitted in the cylinder portion for sliding movement therealong, and an end member 28, which has an internally threaded aperture formed therethrough, is securely fixed to the opening end portion by means of bolts 29. A screw 30 is threadedly engaged with the aperture of the end member 28 with its forward end held in contact with the outer end face of the piston 27.

The rotary knife 22 is a flat annular shape having opposite faces 22*a* and 22*b* and is fitted on the reduced-diameter portion 24 of the flange 21 for sliding movement therealong with the face 22*b* directed toward the end face 23*a* of the flange portion 23. A resilient member 31 in the form of a belleville spring is fitted on the reduced-diameter portion 24 of the flange 21 for urging the rotary knife 22 against the end face 23*a* of the flange portion 23, and a retaining ring 32 is mounted on the reduced-diameter portion 24 at its end portion to retain the resilient member 31 in position. The retaining ring 32 is prevented from rotating relative to the flange 21 by a stop screw 33 interposed therebetween.

The rotary knife assembly in accordance with the present invention includes shifting means mounted on the flange 21 for shifting the rotary knife 22 in a direction away from the flange portion 23 against the urging force of the resilient member 31. The shifting means comprises a plurality of axially extending bores 34 formed through the flange portion 23 in circumferentially equally spaced relation to one another, and a plurality of shifting members each including a plunger member 35 and an abutting member 36. Each plunger member 35 is accommodated in a respective one of the axial bores 34 so as to be movable in an axial direction between an extended position where the plunger member 35 is extended outwardly from the end face 23*a* of the flange portion 23, and a retracted position where the plunger member 35 is retracted from the end face 23*a* of the flange portion 23 into the bore 34.

More specifically, each of the bores 34 includes a cylinder portion 34*a* opening to the end face 23*b* of the flange portion 23, a recess 34*b* opening to the end face 23*a* of the flange portion 23 and a connecting bore portion 34*c* having a smaller diameter than the cylinder portion 34*a* and communicating the cylinder portion 34*a* and the recess 34*b* together. The recess 34*b* is of an elongated form extending circumferentially of the flange portion 23 and has a width greater than the diameter of the connecting bore portion 34*c*. Each plunger member 35 includes a pin portion 35*a*, a head portion 35*b* formed at one end of the pin portion 35*a* and having a diameter greater than the pin portion 35*a*, and an abutting member 36 having a thickness generally equal to the depth of the recess 34*b* is releasably mounted on the other end of the pin portion 35*a*. Each plunger member 35 is received in a respective one of the bores 34 with the head portion 35*b* received in the cylinder portion 34*a*, and the abutting member 35*c* is received in the recess 34*b*, so that the plunger member 35 is prevented from coming out of the bore 34. The abutting member 36 has such a rectangular shape as to be fitted in the recess 34*b* when arranged therealong and has a length greater than the width of the recess 34*b*. Thus, the abutting member 36 can be fitted into the recess 34*b* when its longitudinal direction is aligned with the longitudinal direction of the recess 34*b* while the abutting member 36 cannot be fitted thereinto when it is turned so that the longitudinal direction is shifted from the longitudinal direction of the recess 34*b*. In addition, the abutting member 36 is of a thickness such that when the abutting member 36 is released from the recess 34*b* to be interposed between the end face 23*a* of the flange portion 23 and the rotary knife 22, the rotary knife 22 is moved to a desired offset position in an axial direction.

Furthermore, the shifting means further includes a plurality of coil springs 37 each accommodated in a respective one of the cylinder portions 34*a* of the bores 34 to act between the head portion 35*b* of a respective one of the plunger members 35 and the end wall of the cylinder portion 34*a* to resiliently move the plunger member 35 in a direction away from the rotary knife 22 to receive the abutting member 36 in the recess 34*b*. In addition, the head portion 35*b* includes a hole of a prescribed shape into which a tool such as a wrench may be fitted.

For installing the aforesaid rotary knife assembly in a cutting machine, the rotary knife 22 and the resilient member 31 are first fitted on the reduced-diameter portion 24 of the flange 21, in that order, and the retaining ring 32 is fitted thereon to retain these parts in position. Thereafter, a wrench is inserted into the head portion 35*a* of each plunger member 35 to gause the plunger member 35 to move axially toward the rotary knife 22.

Figure 6:
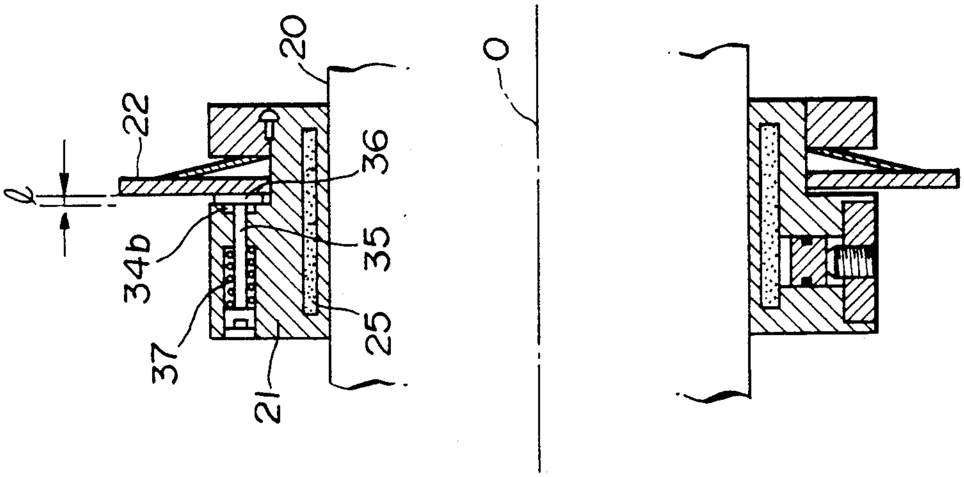
FIG. 6 is a view similar to FIG. 5, but showing the state in which the tool is being shifted.

As a result, the abutting member 36 mounted on the plunger member 35 is released from the recess 34*b* to be brought into abutting engagement with the face 22*b* of the rotary knife 22, so that the rotary knife 22 is moved in a direction away from the flange portion 23 against the urging force of the resilient member 31. Then, after the abutting member 36 is completely released from the recess 34*b*, the wrench is turned an angle of 90 degrees so that the abutting member 36 becomes misaligned with the recess 34*b*. The wrench is then released, and the plunger member 36 is caused to move back owing to the urging force of the coil spring 37. Hence, the plunger member 36 is stopped with the abutting member 36 held in abutting contact with the end face 23*a* of the flange portion 23, and the rotary knife 22 is shifted to a desired offset position which is spaced a distance 1 from the end face 23*a* as shown in FIG. 6.

Subsequently, the aforesaid flange 21 is fitted on a predetermined portion of the shaft 20, and the screw 30 is tightened to cause the piston 27 to move radially inwardly of the flange portion 23. When the piston 27 is caused to move inwardly, the operating oil is pressurized into the pressure oil chamber 25 to exert pressure on the rotary shaft 20 to securely fix the flange 21 to the shaft 20. Similarly, all of the other rotary knives are fixed to the shaft 20.

Then, after having installed the mating rotary knife assembly in the cutting machine, the rotary knife assembly as described above is installed in the cutting machine. When both of the mating assemblies are installed, each pair of the mating rotary knives are spaced a distance smaller than the offset 1 from each other. Thereafter, the wrench is fitted again into the head portion 35*b* of each plunger member 35 and is turned 90 degrees to bring the abutting member 36 into alignment with the elongated recess 34*b*, so that the abutting member 36 is retracted into the recess 34*b*. With this procedure, the rotary knife 22 is caused to move toward the flange portion 23 to be brought into contact with the immovable rotary knife of the mating assembly, and the resilient member 31 is compressed by a prescribed amount as compared with the state as shown in FIG. 5. Thus a uniform contact pressure is exerted between the mating rotary knives.

In the rotary knife assembly as described above, the contact pressure between the mating rotary knives can be set to an optimal value by adjusting the offset amount 1 of the rotary knife 22 in advance, and hence the assemblies can be utilized even for the cutting machine without any shaft-moving mechanism, thereby being very economical. In addition, the contact pressure can be adjusted to a desired Constant value by changing the relative position of the flange 21 on the shaft 20, thereby enabling a high-precision cutting to be effected.

In particular, the shifting and recovery of the rotary knife 22 can be easily done by a simple operation which includes moving and turning the plunger member 35, and hence the assembly operation can be simplified. Furthermore, since the offset amount is determined by the thickness of the abutting member 36, the setting of the rotary knife 22*a* can be always done with high precision.

Figure 7:
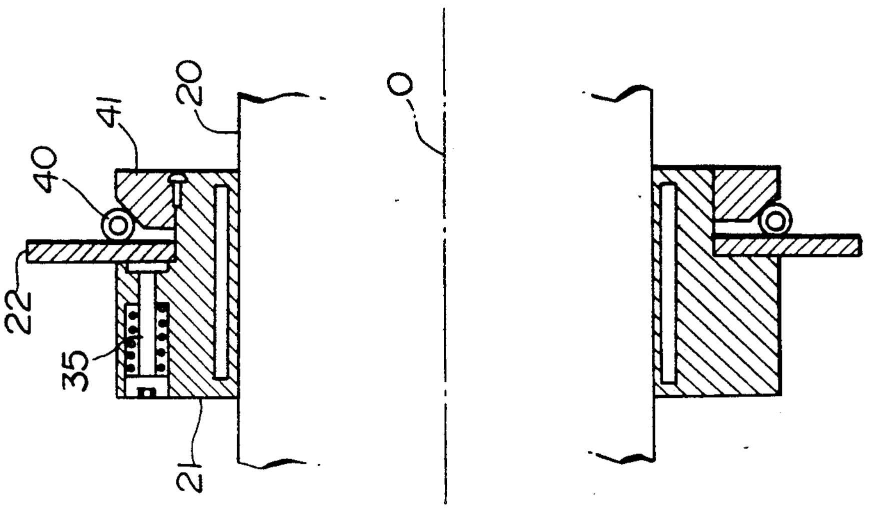
FIG. 7 is a view similar to FIG. 5, but showing a modified rotary knife assembly in accordance with the present invention.

FIG. 7 depicts a modified rotary assembly in accordance with the present invention which differs from the previous embodiment only in that the belleville spring is replaced by a coil spring 40 which is retained by a retaining ring 41.

Figure 8:
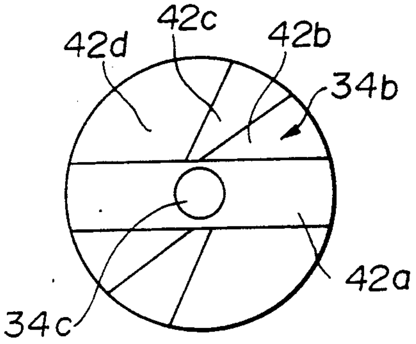
FIG. 8 is a plan view of a recess of another modified rotary assembly in accordance with the present invention.

FIG. 8 depicts another modified rotary assembly which differs from the previous embodiments in that the recess 34*b* of the bore 34 is formed to have stepped portions arranged circumferentially of the recess 34*b*. More specifically, as shown in FIG. 8, the recess 34*b* has a first portion 42*a* of a generally rectangular shape extending circumferentially of the flange portion 23, a second portion 42*b* shallower than the first portion and shifted counterclockwise therefrom, a third portion 42*c* shallower than the second portion 42*b* and shifted counterclockwise therefrom, and a fourth portion 42*d* shallower than the third portion 42*c* and disposed between the third portion 42*c* and the first portion 42*a*. Thus, the abutting member 36 is adapted to be received on the second portion 42*b* when turned 30 degrees from its retracted position, on the third portion 42*c* when turned 60 degrees, and on the fourth portion 42*d* when turned 90 degrees. Furthermore, the abutting member 36 is formed to have a thickness equal to the depth of the first portion 42*a*, and the depths of the aforesaid portions 42*a* to 42*d* are determined so that when the abutting member 36 is received on the respective portions, the abutting member 36 is extended stepwise to provide three different offset amounts. With this construction, the offset amount can be set, for example, to 2 mm for 30-degree turning of the plunger member 35, 1.5 mm for 60 degree turning and 1 mm for 90-degree turning. Therefore, a finely-adjusted setting of the contact pressure can be achieved.

Figure 9:
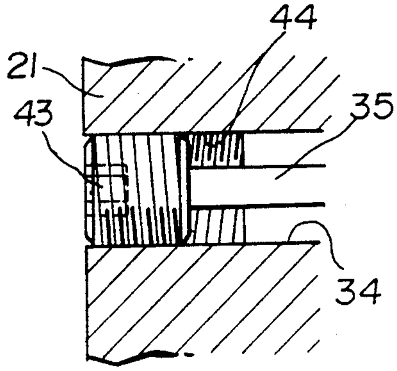
FIG. 9 is an enlarged cross-sectional view of a part of a further modified rotary knife assembly.
Figure 10:
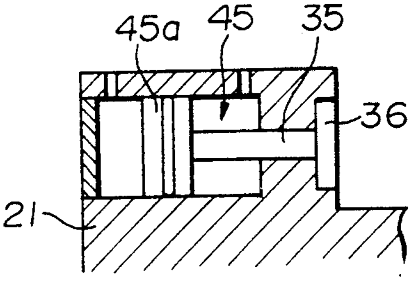
FIGS. 10 and 11 are views similar to FIG. 9, but showing further modified rotary knife assemblies.
Figure 11:
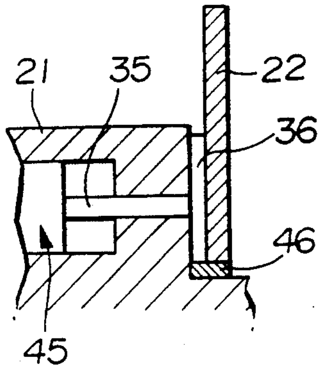

FIG. 9 depicts a further modified rotary knife assembly of the invention. In this embodiment, the plunger member 35 includes an externally threaded head portion 43 which is threadedly engaged with an internally threaded portion 44 of the bore 34. FIG. 10 shows an embodiment in which the plunger member 35 is fixed to a piston 45*a* of a cylinder and piston unit 45 which is connected to an external pressure oil source (not shown). Furthermore, in FIG. 11, the plurality of plunger members 35 are replaced by a single plunger member 35. In order to avoid any errors in the alignment of the knife with a rotational axis, an annular sleeve 46, interposed between the rotary knife 22 and the flange 21, is securely fixed to the abutting member 36. In this embodiment, there is no recess to receive the abutting member.

Figure 1:
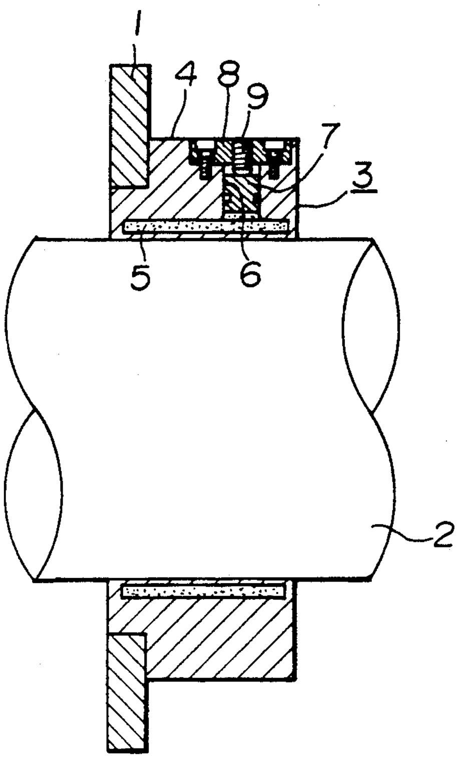
FIG. 1 (PRIOR ART)
FIG. 1 is a cross-sectional view of a conventional rotary knife assembly.
Figure 2:
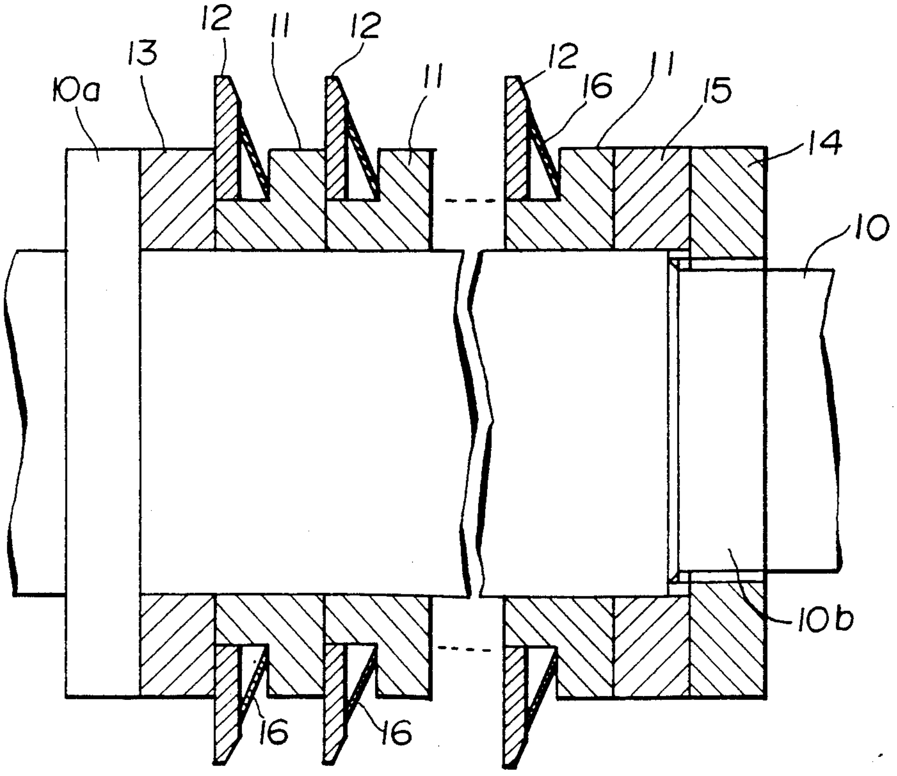
FIG. 2 (PRIOR ART)
FIGS. 2 to 4 are cross-sectional views of other conventional rotary knife assemblies, respectively.
Figure 3:
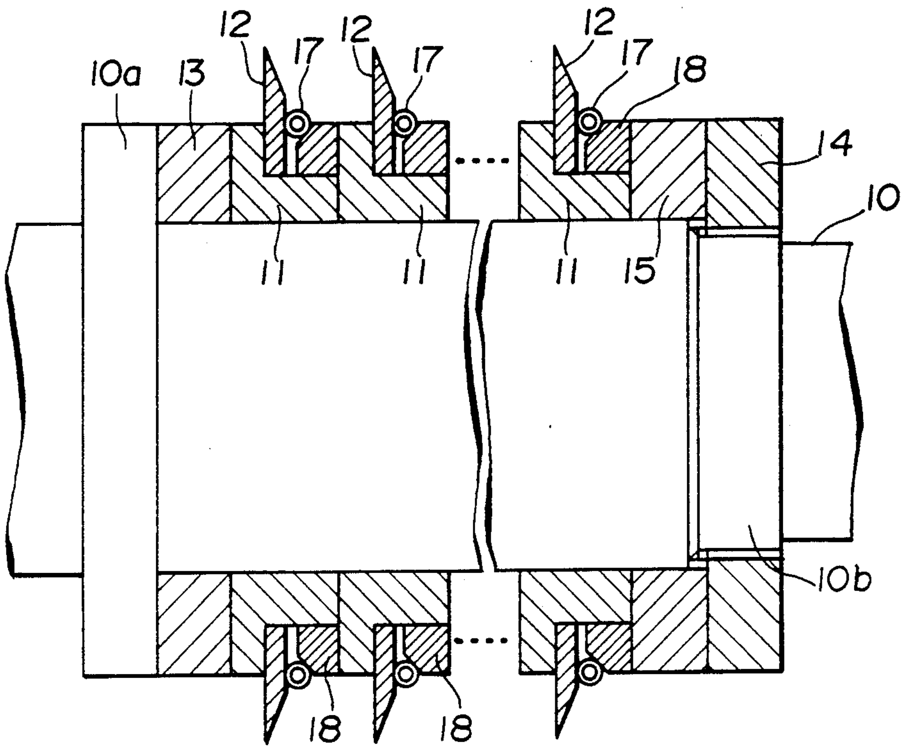
FIG.3 (PRIOR ART)
Figure 4:
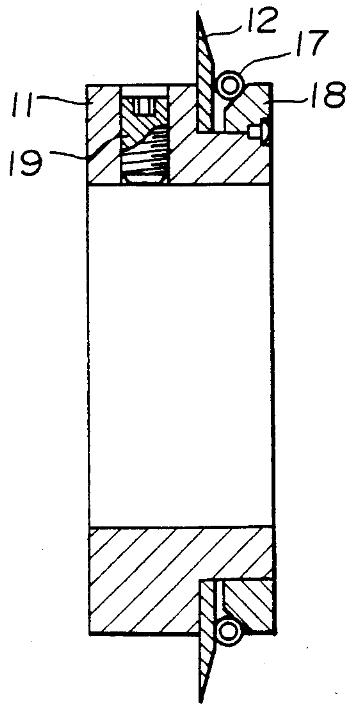
FIG.4 (PRIOR ART)
Figure 12:
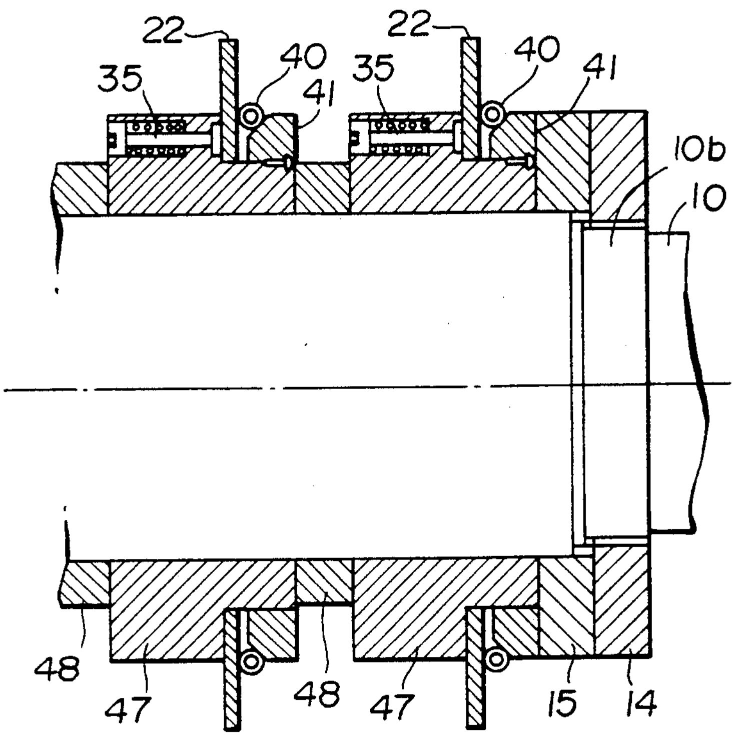
FIG. 12 is a view similar to FIG. 5, but showing a further modified assembly in accordance with the present invention.

FIG. 12 depicts a further modified rotary knife assembly in which flanges 47 without oil chambers are used. Similarly to the prior art assembly shown in FIG. 3, the rotary shaft 10 includes a flange portion and an externally threaded portion 10*b*, and the flanges 47 are fitted on the shaft 10 in series in such a manner that the flange arranged at one end is disposed adjacent to the flange portion with a collar interposed therebetween, and a nut member 14 is threaded on the externally threaded portion 10*b* with the collar 15 interposed between the nut member 14 and the flange 47 arranged at the other end. In this embodiment, however, a collar 48 of a smaller diameter than the flange 47 is disposed adjacent to the flange portion of a respective one of the flanges 47 to ensure a sufficient spacing necessary for the fixing operation.

Obviously many modifications and variations of the present invention are possible in light of the above teachings. It is therefore to be understood that within the scope of the appended claims, the invention may be practiced otherwise than as specifically described.

What is claimed is:

1. A rotary knife assembly comprising:

a rotary shaft having an axis of rotation therethrough;

a flange fitted on and securely fixed to said rotary shaft, said flange including a radially-outwardly protruding flange portion having opposite end faces and at least one bore extending axially thereof, and a reduced diameter portion disposed adjacent to said flange portion;

a rotary knife of an annular shape having opposite faces and fitted on said reduced-diameter portion of said flange with one of said opposite faces directed toward one of said opposite end faces of said flange portion;

a resilient member mounted on said flange for urging said rotary knife toward said flange portion; and shifting means including at least one shifting member having an abutting member of a predetermined thickness and being movably accommodated in said bore of said flange portion so as to shift said rotary knife through a distance equivalent to the thickness of said abutting member in a direction away from said flange portion against the urging force of said resilient member.

2. A rotary knife assembly as recited in claim 1, wherein said shifting member being movable between an extended position wherein said abutting member is extended outwardly from said one end face of said flange portion and a retracted position wherein said abutting member is retracted from said one end face of said flange portion into said bore.

3. A rotary knife assembly as recited in claim 2, wherein said shifting member includes a plunger member having a head portion formed at one end thereof, said abutting portion being mounted on the other end of said plunger member, said bore being formed through said flange portion and including a cylinder portion opening to the other end face of said flange portion, a recess opening to said one end face of said flange portion and a connecting bore portion having a smaller diameter than said cylinder portion, whereby said cylinder portion and said recess communicate with one another; said shifting member being accommodated in said bore with said head portion received in said cylinder portion while said abutting member is received in said recess.

4. A rotary knife assembly according to claim 3, in which said recess of said bore is of an elongated form having a prescribed width and length, said abutting member of said shifting member having such an elongated shape as to be fitted in said recess when arranged therealong and having a length greater than said width of said recess, said abutting member having a thickness such that when said shifting member is moved to said extended position, said abutting member interposed between said one end face of said flange portion and said rotary knife moves said rotary knife to a prescribed offset position.

5. A rotary knife assembly as recited in claim 4, wherein said shifting means further comprises a coil spring accommodated in said cylindrical portion of said bore to act between said head portion of said plunger member and said flange portion to resiliently urge said plunger member in a direction away from said rotary knife.

6. A rotary knife assembly as recited in claim 5, wherein said shifting means comprises a plurality of said axially extending bores formed in said flange portion in circumferentially equally spaced relation to one another, and a plurality of said shifting members each accommodated in a respective one of said bores.

7. A rotary knife assembly according to claim 6, further comprising a retaining ring mounted on said reduced-diameter portion of said flange for retaining said resilient member in position.

8. A rotary knife assembly as recited in claim 3, wherein said recess includes a plurality of step portions having different depths and spaced from one another, whereby said abutting member is selectively received on a respective step portion.

9. A rotary knife assembly as recited in claim 2, wherein said bore has an internally threaded portion, and wherein said shifting member includes an externally threaded head portion threadedly engaged with said internally threaded portion 10. A rotary knife assembly as recited in claim 2, wherein said shifting means includes a cylinder and piston unit, said abutting member being mounted on the piston of said unit.

11. A rotary knife assembly as recited in claim 2, comprising a plurality of said flanges fitted on said shaft in series and a plurality of collars each fitted on said shaft and disposed adjacent to the other end face of said flange portion of a respective one of said flanges, each of said collars having a diameter smaller than that of said flange.

* * * * *